(12) United States Patent
Rasheed et al.

(10) Patent No.: US 8,302,377 B2
(45) Date of Patent: Nov. 6, 2012

(54) GROUND-BASED SIMPLE CYCLE PULSE DETONATION COMBUSTOR BASED HYBRID ENGINE FOR POWER GENERATION

(75) Inventors: Adam Rasheed, Glenville, NY (US); Narendra Digamber Joshi, Schenectady, NY (US); Venkat Eswarlu Tangirala, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 779 days.

(21) Appl. No.: 12/362,783

(22) Filed: Jan. 30, 2009

(65) Prior Publication Data

US 2010/0192536 A1 Aug. 5, 2010

(51) Int. Cl.
*F02K 5/02* (2006.01)
(52) U.S. Cl. ............. 60/247; 60/39.38; 60/39.76; 431/1
(58) Field of Classification Search ............... 60/39.38, 60/39.76, 247, 752, 753, 754, 755, 756, 757, 60/758, 759, 760; 431/1
See application file for complete search history.

(56) References Cited

U.S. PATENT DOCUMENTS

| | | | |
|---|---|---|---|
| 2,567,079 A * | 9/1951 | Owner et al. | 60/39.37 |
| 6,442,930 B1 * | 9/2002 | Johnson et al. | 60/226.1 |
| 6,584,765 B1 | 7/2003 | Tew et al. | |
| 7,229,249 B2 * | 6/2007 | Durocher et al. | 415/213.1 |
| 7,340,903 B2 | 3/2008 | Lu et al. | |
| 2005/0144959 A1* | 7/2005 | Lu et al. | 60/776 |
| 2005/0210879 A1 | 9/2005 | Murayama et al. | |
| 2007/0180811 A1 | 8/2007 | Rasheed et al. | |
| 2007/0180815 A1* | 8/2007 | Tangirala et al. | 60/247 |
| 2008/0006019 A1 | 1/2008 | Tangirala et al. | |
| 2008/0127630 A1 | 6/2008 | Vandervort et al. | |

* cited by examiner

*Primary Examiner* — William H Rodriguez
*Assistant Examiner* — Michael B Mantyla
(74) *Attorney, Agent, or Firm* — Richard A. DeChristofaro

(57) ABSTRACT

An engine contains a compressor stage, a compressor plenum, an inlet valving stage, a PDC stage, a PDC exit nozzle stage, a transition stage, a high pressure turbine stage, a turbine plenum, and a low pressure turbine stage. The PDC stage contains at least one pulse detonation combustor and each of the compressor plenum, PDC exit nozzle stage and turbine plenum contain a volume used to reduce and/or widen pressure peaks generated by the operation of the PDC stage.

17 Claims, 5 Drawing Sheets

GROUND-BASED SIMPLE CYCLE PULSE DETONATION COMBUSTOR BASED HYBRID ENGINE FOR POWER GENERATION

BACKGROUND OF THE INVENTION

This invention relates to pulse detonation systems, and more particularly, to a ground-based simple cycle pulse detonation combustion engine for power generation.

With the recent development of pulse detonation combustors (PDCs) and engines (PDEs), various efforts have been underway to use PDC/Es in practical applications, such as in aircraft engines and/or as means to generate additional thrust/propulsion, such as in ground based power generation systems. Further, there are efforts to employ PDC/E devices into "hybrid" type engines which use a combination of both conventional gas turbine engine technology and PDC/E technology in an effort to maximize operational efficiency. It is for either of these applications that the following discussion will be directed. It is noted that the following discussion will be directed to "pulse detonation combustors" (i.e. PDCs). However, the use of this term is intended to include pulse detonation engines, and the like.

Because of the recent development of PDCs and an increased interest in finding practical applications and uses for these devices, there is an increasing interest in increasing their operational and performance efficiencies, as well as incorporating PDCs in such a way so as to make their use practical.

In some applications, attempts have been made to replace standard combustion stages of engines with a PDC. However, because of the large-scale unsteadiness of the PDCs, the use of traditional turbine engine components designed for steady flow would be inappropriate resulting in significant performance penalty. Additionally, because of the forces and stresses involved, the use of traditional turbine engine components can be impractical. This is due to the very high pressure and temperature peaks generated by PDC operation.

It is known that the operation of PDCs creates extremely high pressure peaks and oscillations both within the PDC and upstream and downstream components, as well as generating high transient heat loads within the PDC tubes and surrounding components. Because of these high temperatures and pressure peaks and oscillations during PDC operation, it is difficult to develop operational systems which can sustain long term exposure to these repeated high temperature and pressure peaks/oscillations. This is particularly true when trying to employ traditional turbine engine components, such as high pressure and low pressure temperature stages. Further, the use of traditional gas turbine engine configurations can result in the engine unstarting, particularly the compressor portion. This is because of flow oscillations which can propagate upstream due to the PDC operation.

Therefore, there exists a need for an improved method of implementing PDCs in turbine based engines and power generation devices, which address the drawbacks discussed above.

SUMMARY OF THE INVENTION

In an embodiment of the present invention, an engine contains a compressor stage through which a compressed flow passes, a compressor plenum which is coupled to and downstream of the compressor stage and receives the compressed flow, a pulse detonation combustor stage having at least one pulse detonation combustor which receives the compressed flow from the compressor plenum and uses at least a portion of the compressed flow in operation of the at least one pulse detonation combustor. Coupled to the pulse detonation combustor stage is an exit nozzle stage which contains at least one exit nozzle, where exhaust from the at least one pulse detonation combustor is directed to the at least one exit nozzle and the exit nozzle directs the received exhaust out of the exit nozzle stage. Downstream of the exit nozzle stage is at least one turbine stage, where the turbine stage receives the exhaust directed out of the exit nozzle stage.

As used herein, a "pulse detonation combustor" PDC (also including PDEs) is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs (and PDEs) include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. cross-fire).

As used herein, "engine" means any device used to generate thrust and/or power.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
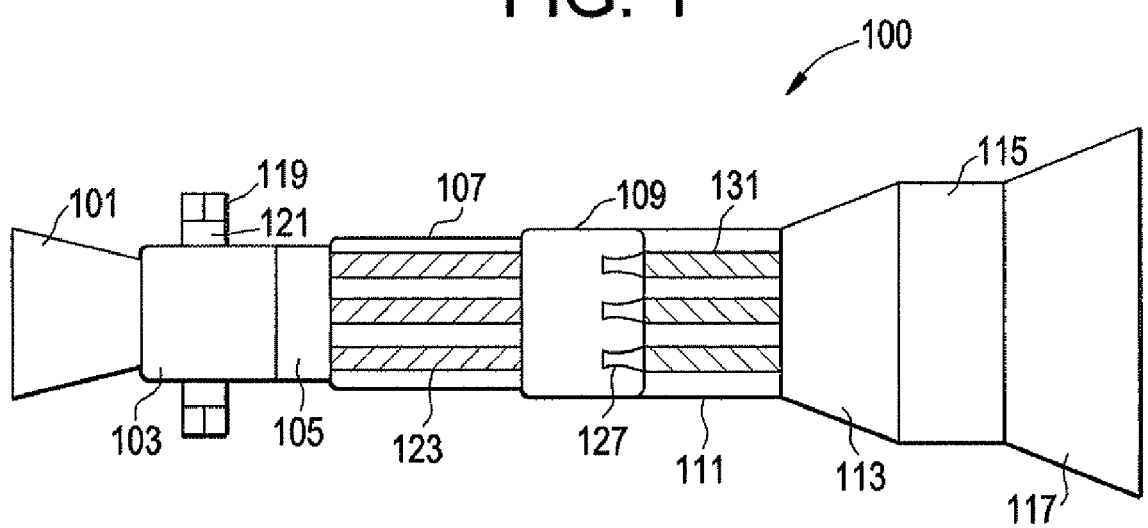
FIG. 1 shows a diagrammatical representation of an exemplary embodiment of the present invention.

FIG. 1 depicts an engine 100 in accordance with an embodiment of the present invention. As shown, the engine 100 contains a compressor stage 101, a compressor plenum 103, PDC inlet valving 105, a PDC stage 107, a PDC exit nozzle stage 109, a transition stage 111, a high pressure turbine stage 113, a turbine plenum 115, and a low pressure turbine stage 117. It is noted that the compressor stage can be either a single or dual shaft type. Specifically, the compressor stage can have a high pressure and low pressure stage (similar to the turbine stage) such that the high pressure compressor stage is coupled to the high pressure turbine stage 113 and the low pressure compressor stage is coupled to the low pressure turbine stage 117.

The compressor stage 101 can be of any known configuration which can compress a fluid, such as air. Downstream of the compressor stage 101 is a compressor plenum 103. The compressor plenum 103 receives the compressed flow from the compressor stage 101 and directs the flow to the PDC inlet valving 105. The compressor plenum 103 is used to prevent the compressor stage 101 from unstarting/stalling due to upstream flow oscillations created as a result of PDC operation. As is known, PDCs have a pulsed operation which cause cyclical pressure rise in both upstream and downstream components. The pressure rise in upstream components (such as the compressor stage 101) can result from pressure oscillations directly from PDCs (i.e., pressure waves due to the detonations), or from the closing of PDC inlet valves (not shown). That is, because the flow from the compressor stage 101 is constant, the closing of PDC inlets could cause pressure increases at the exit of the compressor stage 101. Either of these occurrences, or a combination of both, could result in pressure rises at the compressor stage exit which cause the compressor stage 101 to "stall". Specifically, the pressure at the exit of the compressor stage 101 can be so high as to stop flow through the compressor stage 101.

Therefore, in an embodiment of the present invention, the compressor plenum 103 is of a volume and configuration which minimizes pressure peak oscillations from reaching the exit of the compressor stage 101 to unstart the compressor stage 101. By having an adequate volume, the fluid (e.g., air) within the compressor plenum 103 can compress sufficiently so as to allow the compressor stage 101 to maintain steady flow, while normal PDC operation is maintained.

In an exemplary embodiment, the plenum 103 has a volume which is at least about 10 times the volume of the PDCs 123 being fired at any given time. For example, if the PDCs 123 are operated in a sequence such that a single PDC 123 is fired at any given time, then the plenum 103 has a volume which is about 10 times the volume of the PDC 123. However, if the PDCs are operated in a sequence such that two PDCs 123 are fired at the same time, then the plenum will be about 20 times the volume of a PDC 123.

Further, in an additional exemplary embodiment, the compressor plenum 103 contains a manifold or baffle structure (not shown) to direct or otherwise control the flow within the compressor plenum 103, as needed.

In a further exemplary embodiment, the compressor plenum 103 has at least one has a resonant cavity 119 coupled to it. The resonant cavity 119 provides additional damping for the pressure oscillations that can be experienced because of pressure waves leaking back through the PDC inlet valving 105. In an exemplary embodiment, the resonant cavity 119 contains either an active or passive dampening structure 121 which oscillates as pressure within the resonant cavity 119 and compressor plenum 103 increases and decreases. Thus the dampening structure 121 effectively increases and decreases the volume of the plenum 103 to effectively absorb the pressure oscillations experienced. Thus, the compressor flow from the compressor stage 101 sees little or no pressure oscillations, which allows the stage 101 to operate normally and optimally. The dampening structure 121 can be any mechanical type system (such as an oscillating damped position), or can be any other type of dampening mechanism (such as a viscous liquid), or an acoustic type damper (quarter-wave damper).

In a quarter-wave damper the length of the cavity is chosen to be a quarter of the wavelength of the oscillation that is to be dampened. As waves enter the tube and reflect back, their phase is effectively shifted and they destructively interfere with the remaining waves in the plenum 103. This reduces the amplitude of the oscillations within the plenum 103 at that given frequency. In an exemplary embodiment of the present invention, a plurality of quarter-wave tubes are employed having different sizes so that different frequencies of oscillation within the plenum 103 can be reduced or removed. In a further exemplary embodiment the quarter-wave tubes have an adjustable piston structure (such as item 121) which allows the length of the tubes to be adjusted. In such an embodiment, the adjustment of the pistons, and thus the tube length, can be adjusted actively (i.e., during operation) to tune the dampening to the oscillations being experienced during engine operation.

Downstream of the compressor plenum 103 is the PDC inlet valving 105. The PDC inlet valving 105 directs and/or controls the flow from the plenum 103 to the PDC stage 107 and specifically to the PDCs 123 within the PDC stage 107. The inlet valving 105 is of any known or used configuration, structure and/or operation to allow flow to enter the PDCs 123 in the PDC stage 107. For example, the inlet valving 105 can be comprised of mechanical valves which open and close as needed to allow flow to enter the PDCs 123. In a further exemplary embodiment, the inlet valving 105 can employ aerodynamic types valves, which have no, or a limited number of, moving parts.

Further, in an exemplary embodiment, the inlet valving 105 is configured such that it prevents or otherwise minimizes the pressure rises from within the PDCs 123 from traveling upstream into the plenum 103. This will aid in shielding the upstream components, such as the compressor stage 101, from experiencing pressure oscillations which can be detrimental structurally and operationally. Because many structures and systems are known for controlling the flow into PDCs for operation a detailed discussion will not be included herein.

In the shown exemplary embodiment, downstream of the PDC inlet valving 105 is the PDC stage 107 which has at least one PDC 123. In the embodiment shown, the PDC stage 107 replaces a conventional combustion stage in a standard turbine engine configuration, thus making the shown engine 100 a hybrid engine. The present invention is not limited to the number of exact configuration of the PDCs 123. The quantity and configuration of the PDCs 123 are determined based on the operational and performance desired.

In an alternative embodiment, the PDC stage 107 includes both PDCs 123 and conventional combustion devices, depending on the desired performance of the engine 100.

As shown in FIG. 1, the exhaust of the PDCs 123 is directed through the PDC exit nozzle stage 109. It is noted that although this is shown as a separate "stage" in FIG. 1 and is discussed in that manner herein, the PDC exit nozzle stage does not necessarily have to be a distinct and separate "stage." The exit nozzles can be equally considered to be part of the PDCs 123. The use of the term "stage" in defining this portion of the invention, is not intended to be limiting, but for purposes of clarity.

For purposes of the embodiment depicted in FIG. 1 the PDCs 123 are depicted as having a constant cross-section (i.e., a straight tube). The exhaust portions of the PDCs 123 are straight in the depicted embodiment. However, the present invention is not limited to this embodiment. Specifically, it is contemplated that the exhaust portions of the PDCs 123 (i.e., the portion coupled to the stage 109) can have any known configuration and are not intended to be limited to a straight/constant cross-section embodiment. The exact configuration and geometry of the exhaust portions can be optimized based on desired operational and performance characteristics. For example, the exhaust portions of the PDCs 123 can be straight, converging, diverging, and/or converging-diverging.

Figure 2A:
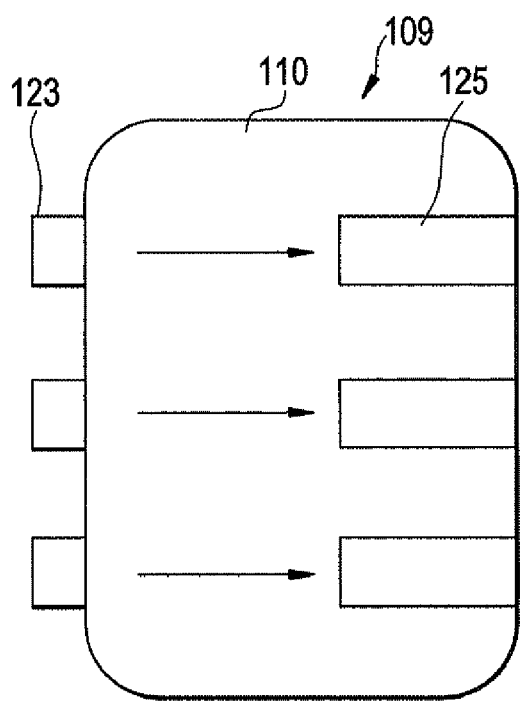
FIGS. 2A through 2C show diagrammatical representations of embodiments of PDC exit nozzles in accordance with various embodiments of the present invention.
Figure 2B:
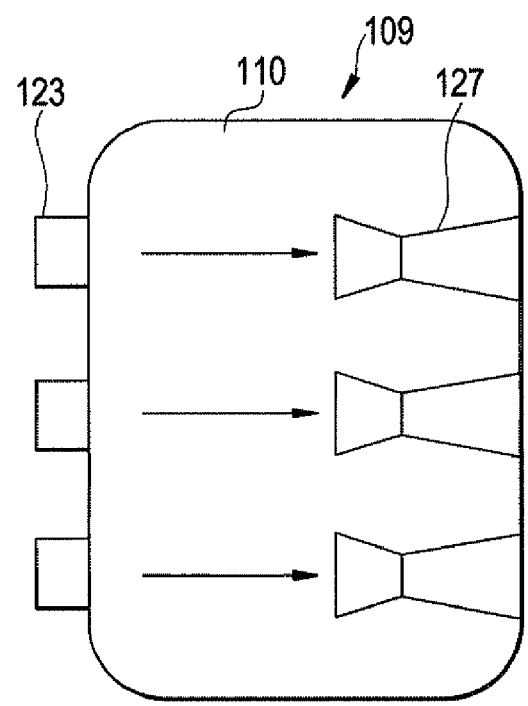
Figure 2C:
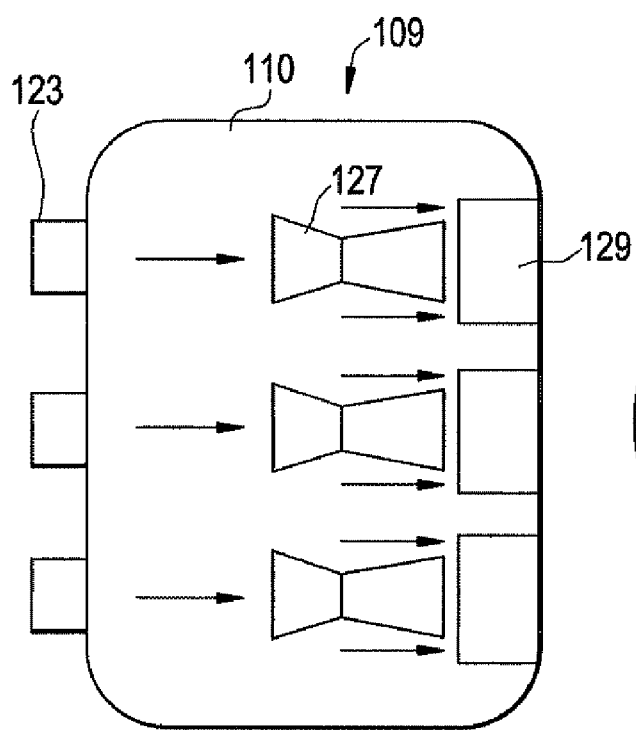

Turning now to the nozzle stage 109, FIGS. 2A through 2C, depict various exemplary embodiments of a PDC exit nozzle stage 109. As can be seen in each of these figures, the exit nozzle stage 109 has a plenum type volume 110 into which the exhaust of the PDCs 123 is directed. This volume 110 aids to control the frequency and operating pressure of the engine, and aids to increase the width of the pressure peak experienced by the engine 100 during operation. Within the stage 109 a plurality nozzles 125 are provided. The nozzles 125 direct the flow (shown by the arrows) from the volume 110 to the downstream components of the engine 100. In various embodiments of the present invention, the nozzles 125 can be of various configurations, sizes, shapes and quantity. In FIG. 2A the nozzles 125 are shown having a constant cross-section (e.g., diameter). In FIG. 2B the nozzles 127 are shown having a converging-diverging geometry. This geometry provides additional frequency and operating control, as well as increasing the width of the operational pressure peak over the embodiment shown in FIG. 2A. In FIG. 2C, the nozzles 127 also have a converging-diverging configuration, and are used in conjunction with ejectors 129. In this embodiment, a portion of the flow in the volume 110 is directed through the nozzles 127 while another portion of the flow is directed around the nozzles 127 and through the ejectors 129. Using this configuration, the system frequency and pressure are controlled better than the embodiment shown in FIG. 2B. Additionally, the width of the system pressure peak is widened larger than that of the embodiment shown in FIG. 2B, as well as weakening the strength of the pressure wave from the PDCs 123.

In an embodiment of the invention, the ejectors 129 entrain air from the volume 110 through the ejector because of the primary jet flow passing through the ejectors from the nozzles 127. In such an embodiment, the net mass flow through the ejectors 129 is increased.

In another exemplary embodiment, there is no plenum volume 110 and the nozzles 125, 127, 129 are coupled directly to the PDCs 123. Effectively, in such an embodiment there is no stage 109 as shown in the figures. Those of skill in the art would be able to construct such an embodiment, coupled with the knowledge disclosed herein.

Of course, the exact configuration, number and shape of the nozzles of the stage 109 are to be optimized based on the desired operational and performance characteristics. Additionally, the number and positioning of the nozzles employed can be varied as desired to achieve the desired performance.

As shown in FIG. 1, downstream of the nozzle stage 109 is the transition stage 111. The transition stage 111 provides a transition from the nozzle stage 109 and the high pressure turbine stage 113. In an embodiment of the present invention, the transition stage 111 contains a plurality of transition tubes 131 which are coupled to the nozzles of the nozzle stage 109 and the high pressure turbine stage 113. The exhaust gases from the PDCs 123 are directed through the tubes 131. In the embodiment shown, the transition tubes 131 are cylindrical tubes. However, it is contemplated that other shapes and cross-sections can be employed for the tubes 131 as desired by performance and operational characteristics.

For example, in an exemplary embodiment of the present invention, the transition tubes 131 can provide a converging-diverging effect. Alternatively, the transition tubes 131 can have a shape which sufficiently transition the flow from the PDCs 123 and/or the nozzles 125/127/129 to the entrance of the turbine stage 113. The exact configuration of the transition tubes 131 may be optimized for performance and operational characteristics, and to properly deliver the PDC exhaust to the turbine portion of the engine 100. Optionally, a plenum structure (not shown) is used rather than the tubes 131.

Figure 3:
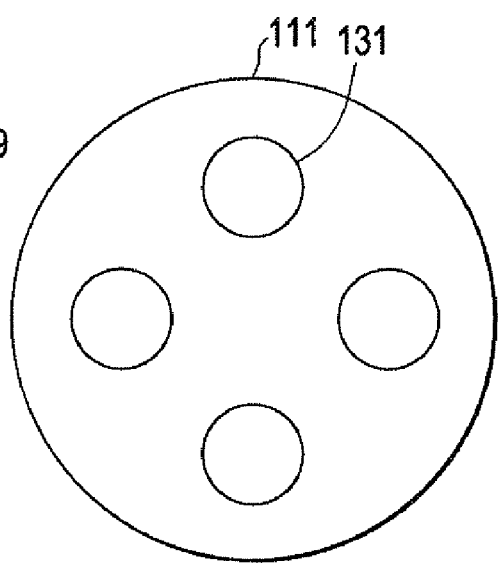
FIG. 3 shows a diagrammatical representation of a transition stage in accordance with an exemplary embodiment of the present invention.

FIG. 3 depicts a cross-section of an embodiment of the transition stage 111, in which both the stage 111 and the tubes 131 have a circular cross-section. As shown in FIG. 3, four tubes 131 are used. However, the present invention is not limited to the use of four tubes 131 as any number can be used. Additionally, the present invention is not limited by the pattern configuration as shown in FIG. 3 which is merely intended to be exemplary in nature.

Figure 4A:
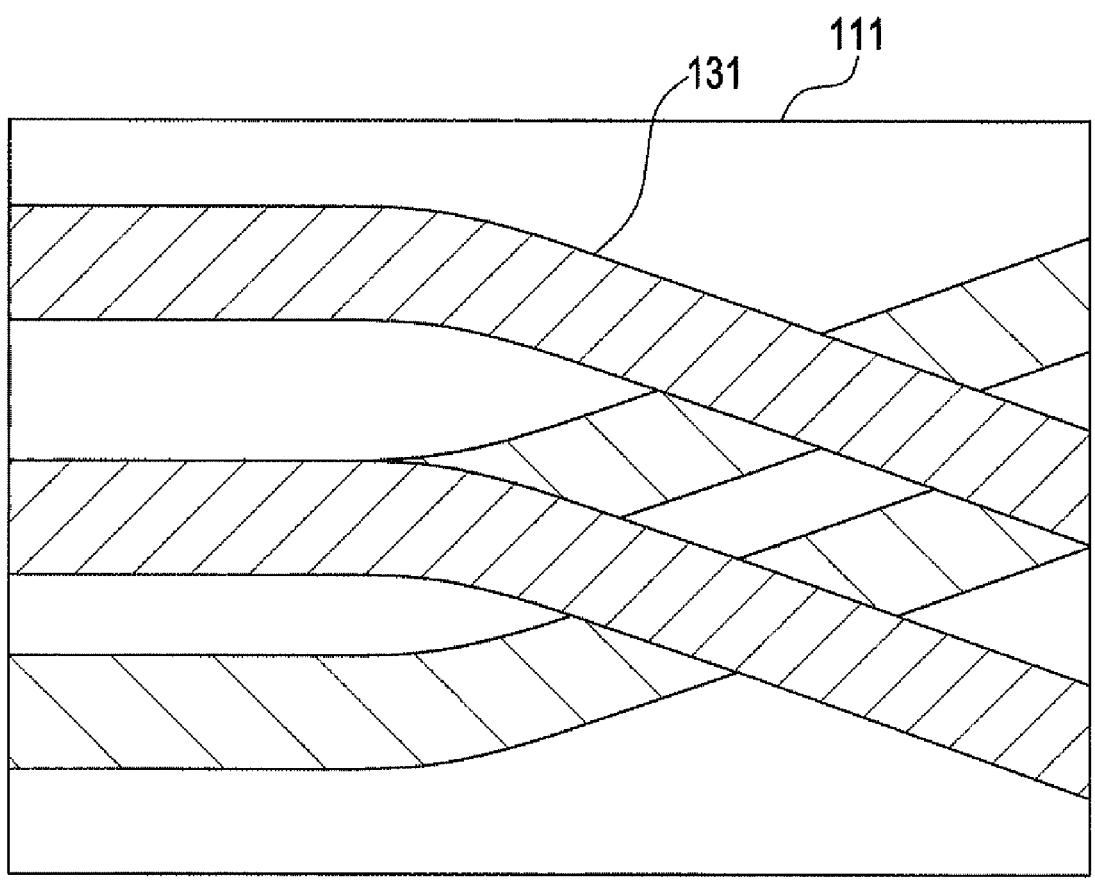
FIGS. 4A and 4B show diagrammatical representations of additional transition stages in accordance with other exemplary embodiments of the present invention.
Figure 4B:
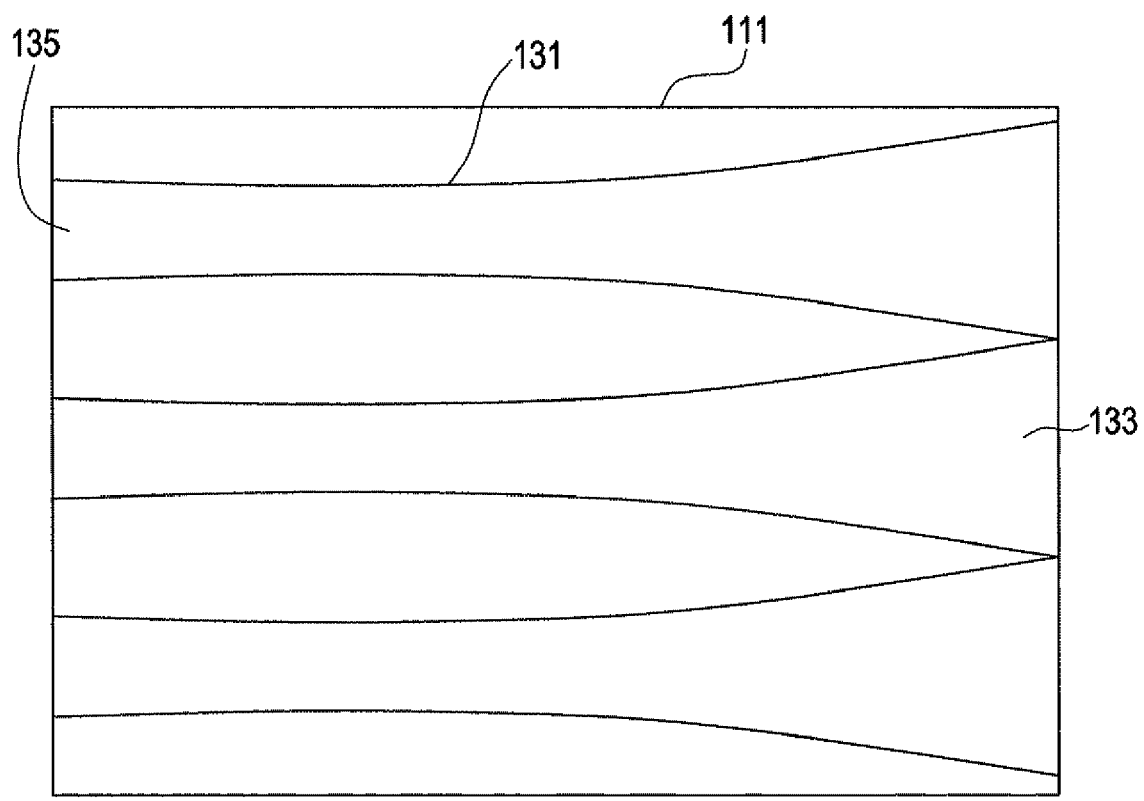

In FIG. 1 and FIG. 3 the tubes 131 are shown as straight (i.e., having a constant cross-section). However, the present invention is not limited in this regard. Specifically, the tubes 131 can have various configurations to optimize performance of the engine 100 and the downstream components. Additional exemplary embodiments are shown in FIGS. 4A and 4B. In FIG. 4A the tubes are twisted in a helical pattern to provide some rotational vectors to the exhaust flow as it enters the turbine stage 113. This embodiment can aid in increasing the performance and efficiency of the turbine stage 113. In the embodiment shown in FIG. 4B, the tubes 131 do not have a constant cross-section. Specifically, the cross-section of the tubes 131 increases as it approaches the turbine stage 113, such that the cross-sectional area of the exit 133 of the tubes 131 is larger than that of its inlet 135. This configuration aids in controlling and/or decreasing the high pressure rises experienced by the components in the engine 100 downstream of the PDCs 123. Of course, other tube 131 geometries and exits can be used. In fact, in another exemplary embodiment, the exits of the tubes 131 can have converging-diverging nozzles, such as that shown in FIG. 2B.

In a further exemplary embodiment, the nozzles 125/127/129 directly couple to the PDCs 123 to the turbine stage. In such an embodiment, the transition stage 111 is not present as shown in FIG. 1. Optionally, the nozzles 125/127/129 can be coupled to the turbine stage via a plenum structure (not shown).

As stated above, following the transition stage 111 is a high pressure turbine stage 113. The high pressure turbine stage 113 can be of any commonly known or used high pressure stage configuration.

Following the high pressure turbine stage 113, and prior to the low pressure turbine stage 117, is a turbine plenum 115. The turbine plenum 115 provides additionally dampening of the pressure increases within the engine 100. The turbine plenum 115 has a volume and configuration as desired by performance and operational characteristics, to provide additional pressure dampening. In a further exemplary embodiment of the present invention, the turbine plenum 115 contains at least one resonant cavity (similar to the resonant cavity 119) which provides additional damping for the pressure oscillations that can be experienced because of pressure waves from the PDCs 123. In an exemplary embodiment, the resonant cavity may also contain either an active or passive dampening structures (similar to the dampening structures 121) which oscillate as pressure within the resonant cavity and plenum 115 increases and decreases. This will aid in protecting downstream components, such as the low pressure turbine stage 117 from damaging pressure spikes.

In a further exemplary embodiment, within the plenum 115 are baffles and/or other flow control structures to control the direction and/or pressure rises in the flow between the high pressure turbine stage 113 and the low pressure turbine stage 117. Those of ordinary skill in the art are capable of implementing and optimizing an internal flow control structure within the plenum 115 as desired by performance and operational characteristics.

In an exemplary embodiment of the present invention work and/or thrust can be extracted from the engine 100 via the turbine stages 113 and 117 through any known and conventional means and methodology. The present invention is not limited in this regard.

In another embodiment of the present invention, the turbine stages 113 and 117 are directly coupled to each other, as the plenum 115 is not used.

It is noted that although the present invention has been discussed above specifically with respect to aircraft and power generation applications, the present invention is not limited to this and can be in any similar detonation/deflagration device in which the benefits of the present invention are desirable.

While the invention has been described in terms of various specific embodiments, those skilled in the art will recognize that the invention can be practiced with modification within the spirit and scope of the claims.

What is claimed is:

1. An engine, comprising:
a compressor stage through which a compressed flow passes;
a compressor plenum which is coupled to and downstream of the compressor stage and receives said compressed flow;
a pulse detonation combustor stage having a plurality of pulse detonation combustors, where said pulse detonation combustor stage receives said compressed flow from said compressor plenum and uses at least a portion of said compressed flow in operation of at least one of said pulse detonation combustors;
an exit nozzle stage coupled to said pulse detonation combustor stage which comprises at least one exit nozzle having a converging-diverging geometry, wherein an exhaust from said at least one pulse detonation combustor is directed to at least one exit nozzle and said at least one exit nozzle directs said received exhaust out of said exit nozzle stage; and
at least one turbine stage downstream of said exit nozzle stage, wherein said at least one turbine stage receives said received exhaust directed out of said exit nozzle stage.

2. The engine of claim 1, wherein said turbine stage comprises a first and second turbine stage and a turbine plenum stage is positioned between said first and second turbine stage.

3. The engine of claim 1, wherein said exit nozzle stage comprises an exit nozzle stage plenum such that said exhaust from said at least one pulse detonation combustor enters said plenum prior to being directed to said at least one exit nozzle.

4. The engine of claim 1, wherein said exit nozzle stage comprises at least one ejector, wherein said at least one ejector cooperates with said at least one exit nozzle to direct said exhaust flow out of said exit nozzle stage.

5. The engine of claim 1, wherein said compressor plenum comprises at least one active or passive dampening device.

6. The engine of claim 1, wherein said exit nozzle stage comprises a plurality of exit nozzles, and
wherein a transition stage is positioned between said exit nozzle stage and said turbine stage, said transition stage comprising a plurality of transition tubes which are coupled, individually, to said plurality of exit nozzles to direct said exhaust to said turbine stage.

7. The engine of claim 6, wherein the transition tubes are twisted in a helical pattern between said exit nozzle stage and said turbine stage.

8. The engine of claim 6, wherein at least one of said transition tubes has a cross-section which is larger adjacent said turbine stage than adjacent said exit nozzle stage.

9. An engine, comprising:
a compressor stage through which a compressed flow passes;
a compressor plenum which is coupled to and downstream of the compressor stage and receives said compressed flow;
a pulse detonation combustor stage having a plurality of pulse detonation combustors, where said pulse detonation combustor stage receives said compressed flow from said compressor plenum and uses at least a portion of said compressed flow in operation of said pulse detonation combustors;
an exit nozzle stage coupled to said pulse detonation combustor stage which comprises a plurality of exit nozzles having a converging-diverging geometry, wherein exhaust from said pulse detonation combustors is directed to said exit nozzles and said exit nozzles direct said received exhaust out of said exit nozzle stage; and
at least one turbine stage downstream of said exit nozzle stage, wherein said at least one turbine stage receives said received exhaust directed out of said exit nozzle stage.

10. The engine of claim 9, wherein said turbine stage comprises a first and second turbine stage and a turbine plenum stage is positioned between said first and second turbine stage.

11. The engine of claim 9, wherein said exit nozzle stage comprises an exit nozzle stage plenum such that said exhaust from said at least one pulse detonation combustor enters said plenum prior to being directed to said exit nozzles.

12. The engine of claim 9, wherein said exit nozzle stage comprises at least one ejector, wherein said at least one ejector cooperates at least one of said exit nozzles to direct said exhaust flow out of said exit nozzle stage.

13. The engine of claim 9, wherein said compressor plenum comprises at least one active or passive dampening device.

14. The engine of claim 9, wherein a transition stage is positioned between said exit nozzle stage and said turbine stage, said transition stage comprising a plurality of transition tubes which are coupled, individually, to said plurality of exit nozzles to direct said exhaust to said turbine stage.

15. The engine of claim 14, wherein the transition tubes are twisted in a helical pattern between said exit nozzle stage and said turbine stage.

16. The engine of claim 14, wherein at least one of said transition tubes has a cross-section which is larger adjacent said turbine stage than adjacent said exit nozzle stage.

17. An engine, comprising:
a compressor stage through which a compressed flow passes;
a compressor plenum which is coupled to and downstream of the compressor stage and receives said compressed flow;
a pulse detonation combustor stage having a plurality of pulse detonation combustors, where said pulse detonation combustor stage receives said compressed flow from said compressor plenum and uses at least a portion of said compressed flow in operation of said pulse detonation combustors;
an exit nozzle stage coupled to said pulse detonation combustor stage which comprises a plurality of exit nozzles, wherein exhaust from said pulse detonation combustors is directed to said exit nozzles and said exit nozzles direct said received exhaust out of said exit nozzle stage; and at least one turbine stage downstream of said exit nozzle stage, wherein said at least one turbine stage receives said received exhaust directed out of said exit nozzle stage, wherein said turbine stage comprises a first and second turbine stage and a turbine plenum stage is positioned between said first and second turbine stage, and wherein said at least one of said exit nozzles has a converging-diverging geometry.

* * * * *